United States Patent [19]
Tsao et al.

[11] Patent Number: 4,991,862
[45] Date of Patent: Feb. 12, 1991

[54] AIRCRAFT TOWING APPARATUS

[75] Inventors: Keh C. Tsao, Mequon; Mark R. Heckenkamp, Brookfield, both of Wis.

[73] Assignee: University of Wisconsin-Milwaukee, Milwaukee, Wis.

[21] Appl. No.: 343,340

[22] Filed: Apr. 26, 1989

[51] Int. Cl.$^5$ .................. B64C 25/50; B60D 1/62
[52] U.S. Cl. .................. 280/421; 280/422; 280/478.1; 244/50; 180/904
[58] Field of Search .................. 180/904; 244/50; 439/35; 280/422, 478.1, 421

[56] References Cited

U.S. PATENT DOCUMENTS

| | | | |
|---|---|---|---|
| 3,719,372 | 2/1973 | Rawlings | 280/422 |
| 4,113,041 | 9/1978 | Birkeholm | 180/14.1 |
| 4,269,429 | 5/1981 | Eichstadt | . |
| 4,418,936 | 12/1983 | Adams et al. | . |
| 4,744,718 | 5/1988 | Logan et al. | . |

FOREIGN PATENT DOCUMENTS 3302771 8/1984 Fed. Rep. of Germany ...... 180/904

OTHER PUBLICATIONS

IBM Technical Disclosure Bulletin, Jun. 1979, pp. 158-159.

Primary Examiner—Charles A. Marmor
Assistant Examiner—Mitchell Bompey
Attorney, Agent, or Firm—Irving D. Ross, Jr.

[57] ABSTRACT

The apparatus disclosed comprises a universal tow and coupling bar for connecting automatically to an aircraft landing nose gear and towing the aircraft during ground transport. The aircraft engaging end of the tow bar has directional adjustment and is hydraulically controlled in three coordinates. The end of the tow bar opposite to the aircraft engaging end is semi permanently connected to the aircraft towing vehicle. The aircraft engaging end of the tow bar contains an automatic hydraulically controlled locking assembly arranged to engage and lock with a mating locking assembly permanently fixed to the aircraft nose wheel structure. In addition to the aforementioned features of the universal tow bar are means for controlling the length of the tow bar, interupting the aircraft's hydraulic steering system, and connecting to the aircraft's telephone system. This invention provides for the automatic coupling of a towing vehicle to most jet aircraft under the control of a single operator functioning from the cab of the towing vehicle.

1 Claim, 3 Drawing Sheets

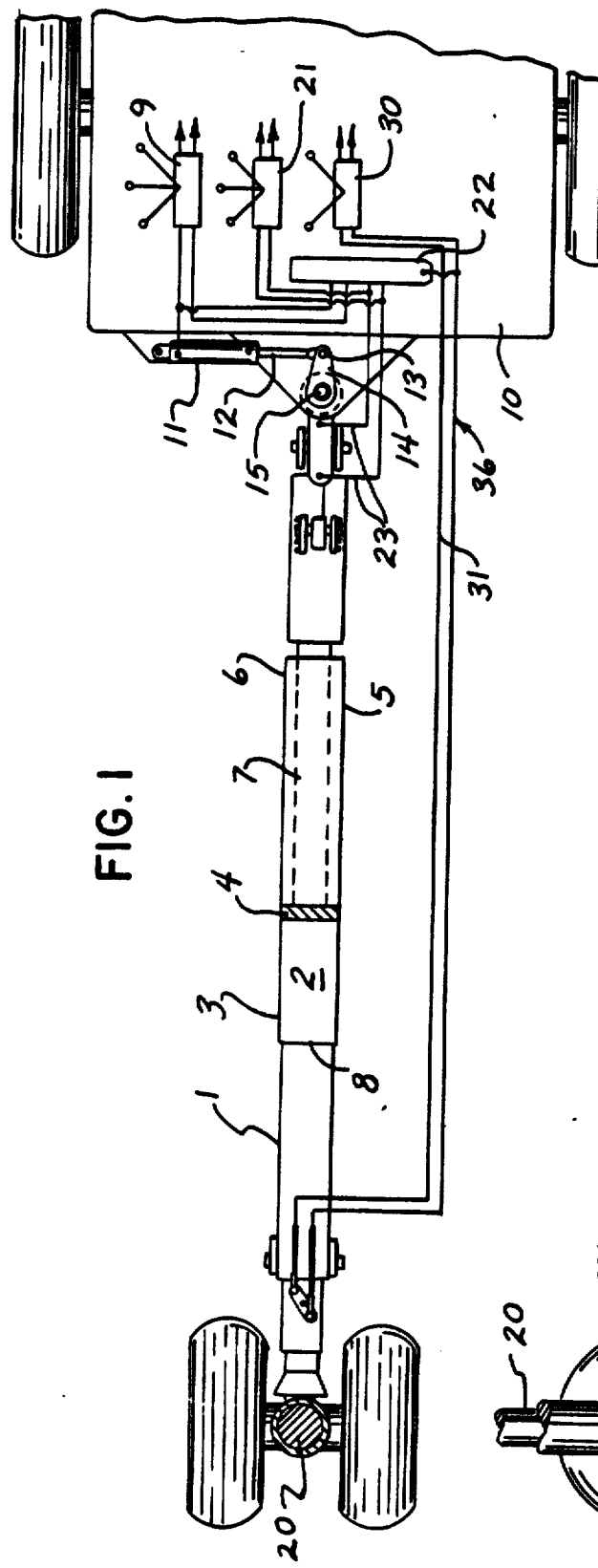
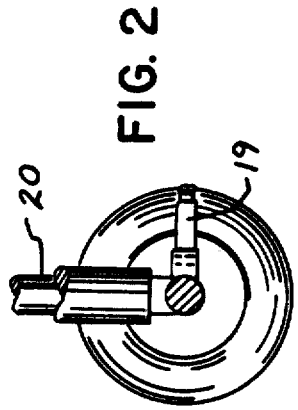
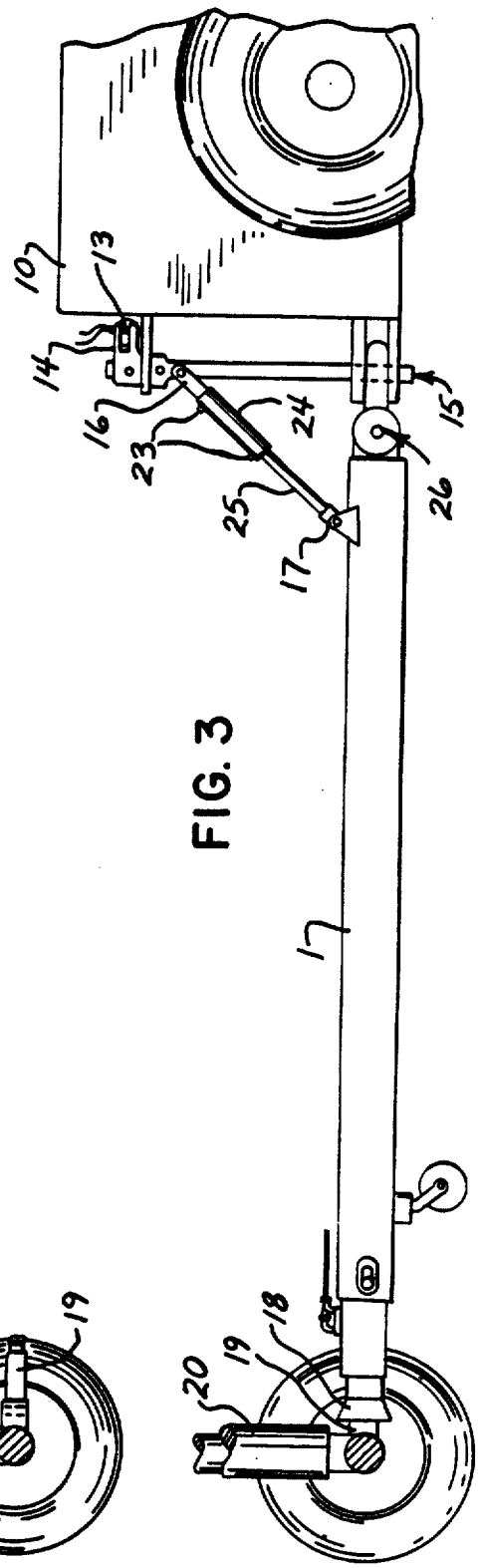

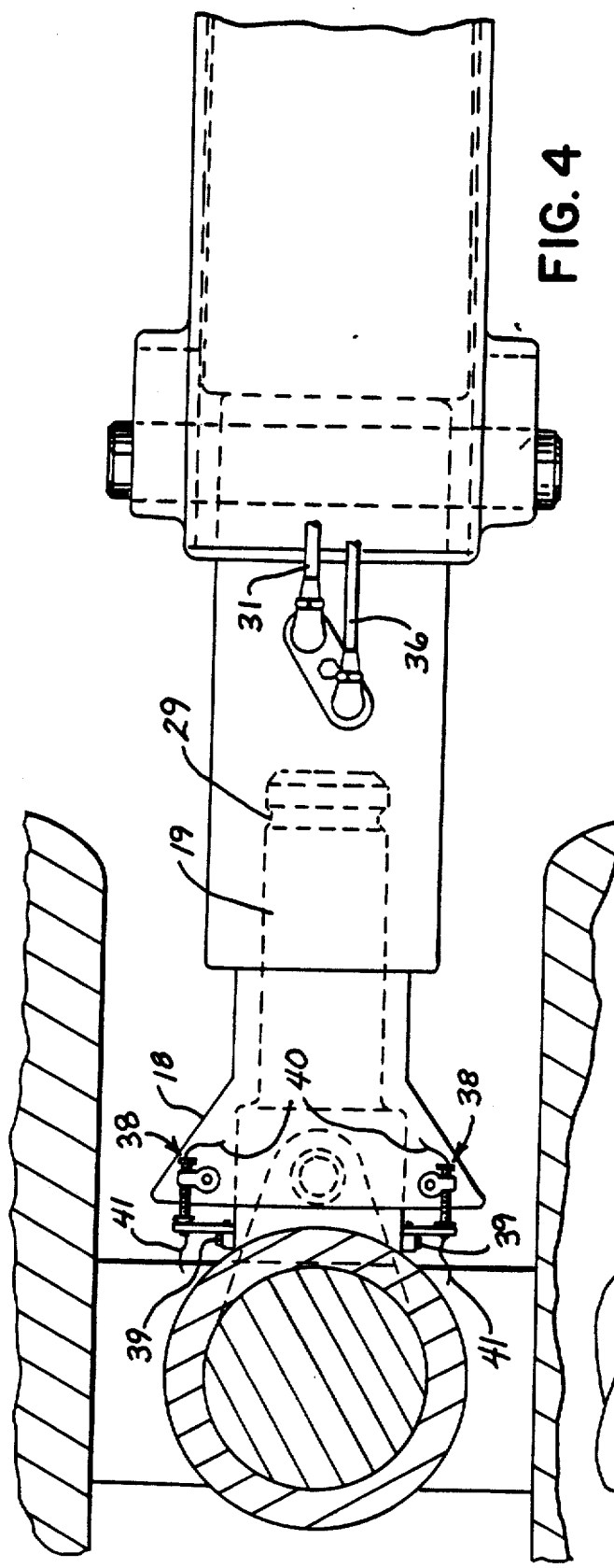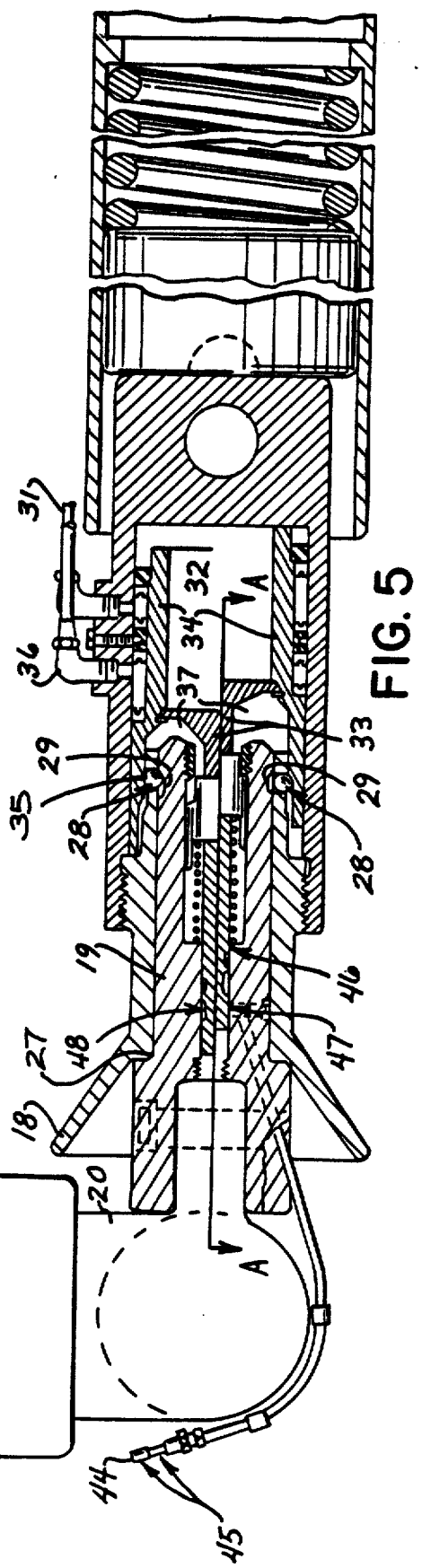

AIRCRAFT TOWING APPARATUS

BACKGROUND OF THE INVENTION

The present method of towing commercial aircraft on the ground at airports today requires the support of a minimum of two and in some cases three maintenance personnel. First a tow bar is selected that is compatible with the type of aircraft to be towed or pushed back from the airport gate. As many as 15 different tow bars may be required in an airport gate area to accommodate the various types of aircraft which have different designs of coupling means attached to their nose landing gear. The selected tow bar partially supported on two wheels is then manually attached to the towing vehicle by means of an eye arrangement. Next the vehicle under power moves the wheel supported tow bar to line up the coupling end of the tow bar in close proximity to the coupling means attached to the aircraft's retractable nose landing gear. The coupling end of the tow bar is then manually lifted and lined up for the manual manipulation of the locking mechanism. This lining up and locking operation requires a vehicle operator and at least one person to lift, align, and effect the coupling of the tow bar to the aircraft.

Before the aircraft is towed or pushed back from the gate two additional operations must be accomplished. First a person must hook up a telephone connection line to the aircraft in order to communicate with the aircraft pilot while walking along the aircraft under tow. The second operation required before towing is the manual disengagement of the aircraft nose hydraulic steering system so as to allow steering of the aircraft while under tow.

PRIOR ART

A search of the prior art uncovered the attached three patents that relate to ground towing of aircraft:
U.S. Pat. No. 4,269,429 Tow Bar for Aircraft
U.S. Pat. No. 4,418,936 Tow Bar Head for Aircraft
U.S. Pat. No. 4,744,718 Aircraft Service Vehicle.
A review of U.S. Pat. No. 4,269,429 indicates recognition of the need for a universal tow bar. U.S. Pat. No. 4,418,936 teaches a design of improved tow bar head. U.S. Pat. No. 4,744,718 teaches a method for vertically adjusting the vehicle aircraft coupling device.

SUMMARY OF THE INVENTION

The subject invention is directed to an automatic universal tow bar designed for hitching to an aircraft for the ground transport of such aircraft at airports. The primary aim and objective of the present invention is to provide a new and novel aircraft ground towing system under the sole control of the towing vehicle operator when situated in the vehicle operator's seat.

The present invention is designed to accomplish the following single operator controlled functions:
1. Length adjustment of tow bar.
2. Horizontal and vertical adjustment of coupling end of tow bar to align with coupling structure permanently attached to aircraft nose landing gear.
3. Engagement and locking of tow bars coupling assembly with aircraft coupling member.
4. Disengagement of tow bar coupling.
5. Automatically, upon coupling, establishes a telephone communication line between the tow vehicle operator and aircraft pilot.
6. Automatically, upon coupling, renders aircraft nose gear hydraulic steering system inoperative and restores same upon uncoupling.

It can be appreciated that the ability to control the above functions by a single operator situated in the towing vehicle removes a potential hazardous condition which presently exists with the use of multiple tow bars and the required manual manipulation of same. It also can be appreciated that the entire towing operation employing the invention will result in cost savings over present methods.

It is noted that the invention contemplates retrofitting present operating aircraft so as to add the coupling means described in this specification and drawings to the aircraft. It is further noted that in order to effect the operation of this towing system and obtain the beneficial advantages therefrom, extensive additions to the towing vehicle will be required.

BRIEF DESCRIPTION OF THE DRAWINGS

The above described advantages and others will become apparent from the following description when read in conjunction with the accompanying drawings which illustrate a preferred embodiment of the invention and wherein:

FIG. 1 is a top elevation of the tow bar hitched to the aircraft nose landing gear exhibiting the tow vehicle and part of the aircraft landing gear;

FIG. 2 is a view of the aircraft coupling probe as permanently attached to the landing nose gear shaft;

FIG. 3 is a plan view of the tow bar in coupled position;

FIG. 4 is a top view of the coupling end of the tow bar as coupled to the aircraft;

FIG. 5 is a cross sectional plan view of the coupling end of the tow bar exhibiting the coupling both in an unlocked and locked position;

DETAILED DESCRIPTION OF THE DRAWINGS

Figure 6:
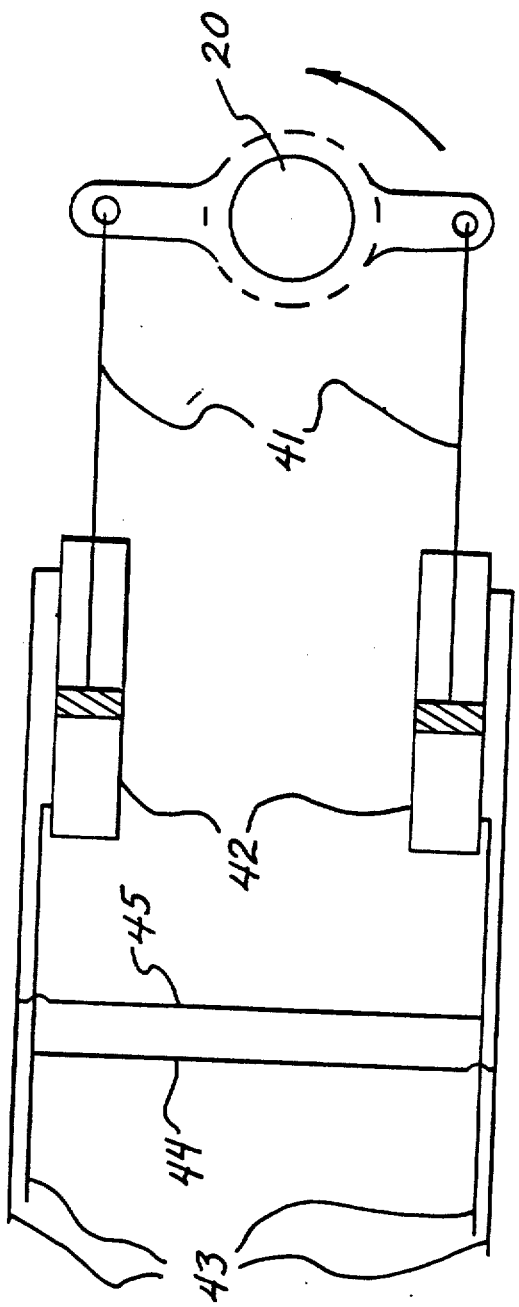
FIG. 6 is a diagrammatic view of the aircraft nose gear steering assembly.

Referring now to the drawings wherein the showings are for the purpose of illustrating preferred embodiments of the invention only, and not for the purpose of limiting same. For example hydraulic means are shown as the method of force transmission while recognizing that pneumatic or electronic media could also be employed.

LENGTH ADJUSTMENT OF TOW BAR

Means to control the length of the tow bar 1 is necessary to avoid interference of the towing apparatus when towing various aircraft. Reference is made to FIG. 1 where tow bar 1 contains an internal hydraulic cylinder arrangement to permit a two position length adjustment. When hydraulic pressure is admitted to chamber 2 from hydraulic line 3 connected to a hydraulic valve located in the tow vehicle cab piston 4 will move to position stop 5 creating a fixed length of the tow bar. In like manner when hydraulic pressure is admitted through hydraulic line 6 to chamber 7 piston 4 will move to position 8 creating a shorter length tow bar. It can be appreciated that if required additional hydraulic cylinders can be added to the tow bar to obtain additional tow bar lengths.

HORIZONTAL AND VERTICAL ADJUSTMENT OF COUPLING END OF TOW BAR

In order to effect a coupling of the tow bar with the aircraft landing nose gear vertical and horizontal adjustment of the coupling end of the tow bar controlled from the cab of the towing vehicle is required.

Reference is made to FIGS. 1, 2, and 3 where hydraulic pressure from swing valve 9 located in cab of the towing vehicle 10 is admitted to cylinder 11 which controls movement of piston rod 12 which in turn controls radial movement of point 13 of link 14. Rotation of link 14 fixed to rod 15 in turn results in rotation of said rod 15 which translates into rotation of member 16. Rotation of member 16 attached to tow bar 1 at point 17 results in rotation of tow bar 1 in a horizontal plane. Thus manipulation of swing value 9 by the operator of tow vehicle 10 permits selective horizontal positioning of tow bar 1 to effect alignment of bell shape member 18 attached to tow bar 1 with nose wheel probe 19 which is permanently attached to landing nose gear shaft 20.

Vertical adjustment of tow bar 1 is accomplished by manipulation of lift valve 21 which controls through float valve 22 pressure in hydraulic lines 23. Hydraulic pressure in said lines 23 are connected to hydraulic cylinder 24 which contains piston rod 25 which in turn is attached to tow bar 1 at point 17. It can be readily seen that admission of hydraulic pressure to cylinder 24 will result in vertical movement of bell shape member 18 attached to tow bar 1 and pivoting about point 26. This selective vertical movement of member 18 for vertical alignment of tow bar 1 with probe 19 is accomplished by the tow vehicle operator through manipulation of valve 21.

TOW BAR ENGAGEMENT AND LOCKING

After tow bar is aligned with nose wheel probe 19 as explained above tow vehicle is advanced toward the aircraft until member 18 engages shoulder of probe 19 at point 27 (FIGS. 4, 5).

This engagement unlocked position is shown in FIG. 4 and in the section below line A—A in FIG. 5. In this engagement position locking balls 28 are aligned with annular groove 29 shown in FIGS. 4 and 5.

The locking position as shown in the section above line A—A in FIG. 5 is assumed by admitting hydraulic pressure from lock valve 30 located in vehicle cab into hydraulic pressure line 31. Such pressure flows into chamber 32 and moves lock assembly 33 toward the aircraft to assume locking position. Locking member 34 attached to lock assembly 33 also moves toward the aircraft and locks locking balls 28 to groove 29 at point 35. Thus the tow bar is firmly secured to the aircraft probe 19 in this locking position.

DISENGAGEMENT OF TOW BAR

To assume the unlocked position shown in the lower section below line A—A in FIG. 5 and disengagement from the aircraft coupling pressure is admitted from valve 30 into pressure line 36 which flows to chamber 37 which moves lock assembly 33 and locking member 34 away from the aircraft to assume the unlocked position to permit towing vehicle 10 to move away from the aircraft carrying with it tow bar 1 and thus effecting disengagement from the aircraft.

TELEPHONE COMMUNICATION

The establishment of telephone communication between the tow vehicle operator and the towed aircraft is explained by attention to FIG. 4 which exhibits the tow bar 1 in coupled position. It can be seen that in this coupled position electrical contact is made between spring loaded contacts 38 attached to tow bar 1 and aircraft plate contacts 39. Telephone wires 40 attached to contacts 38 lead to the cab of tow vehicle 10 and in like manner telephone wires 41 attached to contacts 39 lead to the cabin of the aircraft. It also can be readily seen that upon uncoupling contact between respective contacts 38 and 39 is broken resulting in loss of telephone communication between the aircraft and the tow vehicle.

AIRCRAFT HYDRAULIC STEERING SYSTEM

Reference is made to FIG. 6 where the aircraft nose steering system is diagrammatically shown. It can be appreciated that said aircraft steering system must be disconnected during tow operation so as to permit steering of the towed aircraft by the movement and maneuvering of the tow vehicle.

Steering of the aircraft while taxiing is accomplished by rotating landing nose gear shaft 20. Rotation of shaft 20 is controlled by linear travel of piston rods 41 attached to hydraulic cylinders 42. Thus admission of hydraulic pressure through lines 43 to hydraulic cylinders 42 control the steering of the aircraft during taxi operation. Pressure in lines 43 is controlled by a control valve, not shown, located in aircraft control cabin.

Further reference to FIG. 6 it can be seen that hydraulic pressure in line 44 produces a clockwise rotation of gear shaft 20 while pressure in line 45 produces a counter clockwise rotation of said shaft 20. If lines 44 and 45 are connected pressure in hydraulic cylinder 42 would be equalized and permit gear shaft to float and be subject to outside forces, in this case the tow vehicle, to rotate it and steer the aircraft.

The connecting of lines 44 and 45 is explained by again referring to FIG. 5. Lines 44 and 45 both lead to probe valve 46 which in unlocked position (below section A—A line) causes lines 44 and 45 to be separated and blanked at point 47. When lock assembly 33 assumes locked position probe valve 46 also moves toward the aircraft and assumes locked position. In locked position probe valve 46 uncovers a fluid passage 48 which connects the pressure in lines 44 and 45 previously blocked at point 47 in unlocked position.

Although many modifications of the preferred embodiments described above will become apparent upon a reading and understanding of the specification, it is our intention to include all such modifications and alterations as part of our invention insofar as they come within the scope of the appended claims which follow.

What is claimed is:

1. A universal single operator controlled tow bar for ground transport of aircraft comprising:
   a towbar having an aircraft coupling end and an opposite end containing semi-permanent coupling means for rotatably attaching to a tow vehicle;
   a hydraulic cylinder attached at its cylinder end to said towbar and a piston rod end of said cylinder rotatably attached to said tow vehicle for controlling vertical movement of aircraft coupling end of said towbar, movement of said piston rod in said hydraulic cylinder controlled by admitting and releasing hydraulic pressure to said cylinder from a control valve located in tow vehicle;

a second hydraulic cylinder attached at its cylinder end to said tow vehicle a piston rod end of said cylinder attached to linkage means connected to said towbar for controlling horizontal movement of aircraft coupling end of said towbar, movement of said piston rod in said hydraulic cylinder controlled by admitting and releasing hydraulic pressure to said cylinder from a control valve located in tow vehicle;

an internal hydraulic cylinder means for extending and reducing the length of said towbar by admitting and releasing hydraulic pressure to said hydraulic cylinder means from a control valve in tow vehicle;

electrical contacting means for establishing telephone communication between tow vehicle and aircraft during tow operation including electric spring loaded contacts located on tow vehicle and connected to telephone communication system in tow vehicle said contacts arranged to cooperate during coupling with aircraft fixed electric contacts leading to aircraft communication system;

hydraulic positioning means controlled by admitting hydraulic pressure controlled from a valve in tow vehicle to either side of a two position piston where in locked towing position a valve located in aircraft probe is positioned by movement of said piston to disassociate aircraft controlling steering pressure lines to render aircraft freewheeling and permitting steering control solely from the tow vehicle and in unlocked position said piston positions said valve to connect aircraft controlling steering pressure lines allowing steering control of aircraft solely from aircraft;

aircraft locking means for locking and unlocking said towbar to the aircraft nose wheel probe for aircraft towing, said aircraft locking means consisting of said two position piston located in said towbar controlled by means of a control valve located in tow vehicle where said locking means consists of a plurality of locking balls contained in said towbar when in said locked towing position are forced into engagement by movement of said piston with a locking groove on said aircraft probe and when in said unlocked position said locking balls are disengaged from said groove.

* * * * *